United States Patent [19]

Burrows

[11] Patent Number: 4,638,564
[45] Date of Patent: Jan. 27, 1987

[54] MEASURING GUIDE FOR SAW AND MEASURING GUIDE SYSTEM

[76] Inventor: Philip J. Burrows, 46 Cliff Dr., Narragansett, R.I. 02882

[21] Appl. No.: 842,904

[22] Filed: Mar. 24, 1986

[51] Int. Cl.⁴ ............................ B27B 9/04; B43L 7/00
[52] U.S. Cl. .................................... 33/185 R; 33/464; 83/745
[58] Field of Search ................ 33/169 R, 173, 181 R, 33/185 R, 427, 464, 474, 485; 83/522, 745, 821, 828, 829

[56] References Cited

U.S. PATENT DOCUMENTS

| | | | |
|---|---|---|---|
| 452,677 | 5/1891 | Morrill | 33/173 |
| 1,292,654 | 1/1919 | Seghers | 33/464 |
| 2,466,685 | 4/1949 | Cole | 33/169 R |
| 2,684,538 | 7/1954 | Noe | 33/185 R |
| 2,921,377 | 1/1960 | Hohl | 33/185 R |
| 3,296,702 | 1/1967 | Feddish | 83/745 |
| 3,452,441 | 7/1969 | Baker | 33/185 R |
| 3,874,261 | 4/1975 | Murray | 83/821 |
| 4,281,572 | 8/1981 | Stovall | 83/745 |

Primary Examiner—Richard R. Stearns
Attorney, Agent, or Firm—Gordon G. Menzies

[57] ABSTRACT

The present invention relates to a guide for the cutting of a board and the like which employs indicator means for extending outwarding to indicate a setting upon a rule extending over the surface of the workpiece wherein the end of the rule serves as an abutment for a straight edge to be used as a guide for travel of a saw, and a system therefor.

6 Claims, 3 Drawing Figures

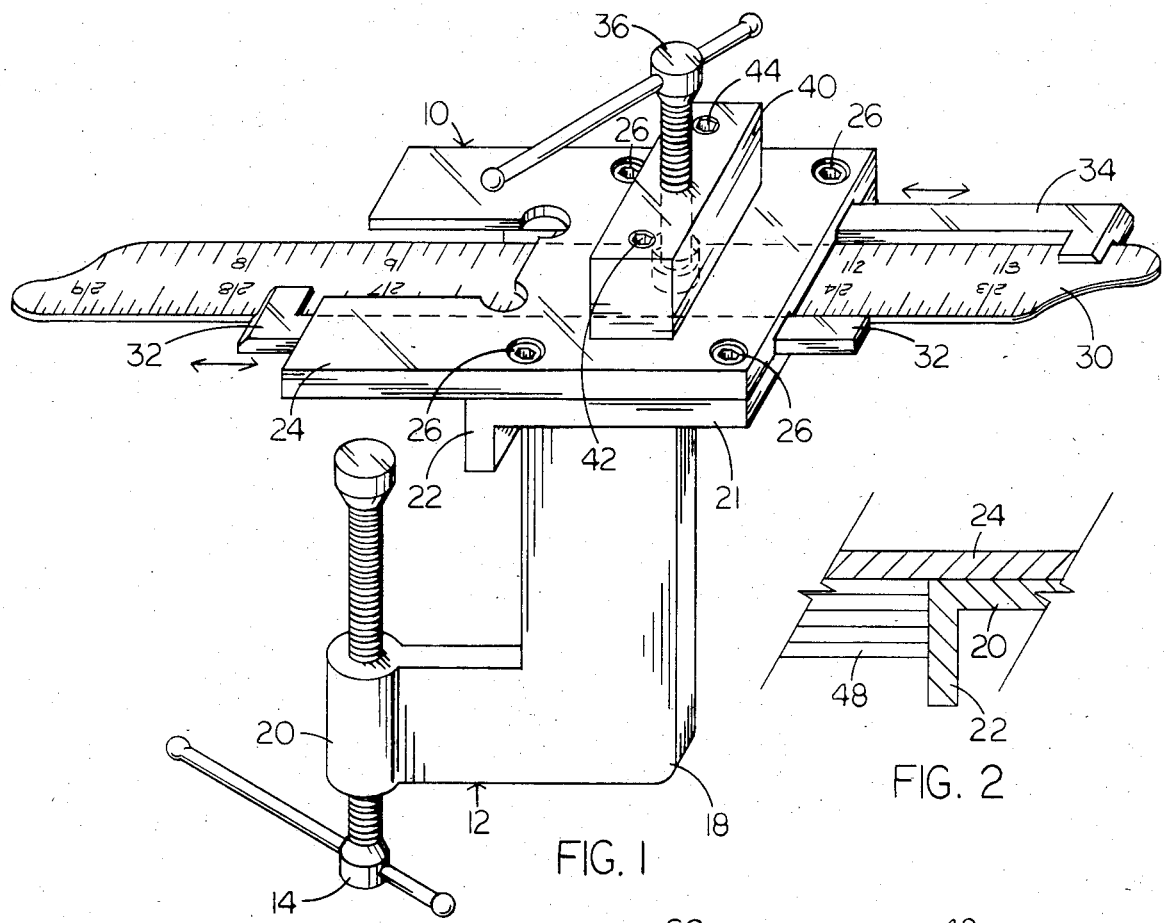
FIG. 1
FIG. 2
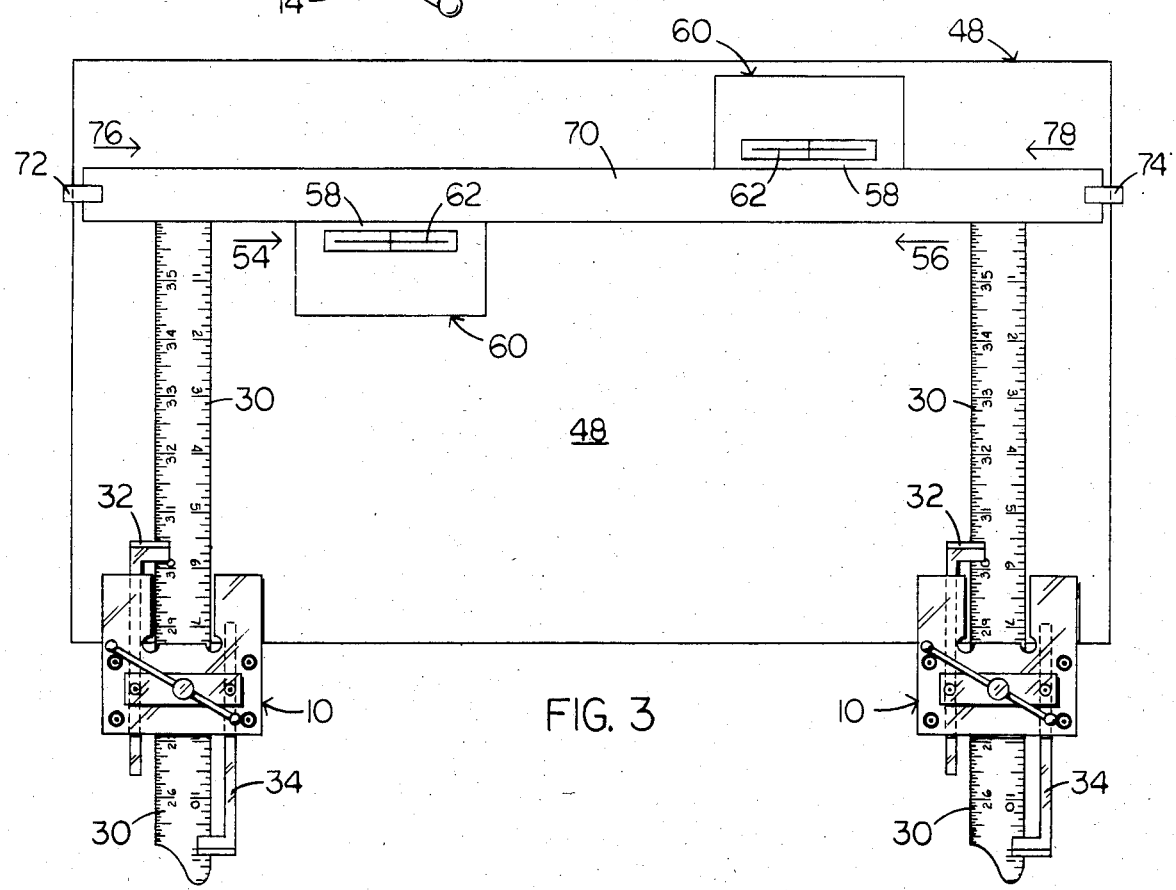
FIG. 3

MEASURING GUIDE FOR SAW AND MEASURING GUIDE SYSTEM

BACKGROUND OF THE INVENTION

In cutting or sawing of pieces of wood and the like, such as sheets of plywood, it is often difficult to achieve a straight cut parallel to an edge of the sheet due to improper alignment of a line to be cut along or a straight edge to be used as a guide between the end of the sheet or board. This results in unsatisfactory material to be used in construction or repair work and frequently results in scrap material. This can naturally result in increased cost of construction and repair and it is therefore highly desirable to be able to make the desired cut without loss of material resulting in scrap, and to which the present invention is directed. Before every cut is made a time consuming mathematical calculation must be made to determine where to clamp the straight edge that guides the saw and any error in such calculation will result in more wasted material.

SUMMARY OF THE INVENTION

The present invention comprises a guide having a first planar surface for placement upon the surface of a workpiece and a second planar surface perpendicular to said first surface for placement against the edge of the workpiece. The guide has a first opening for slidingly receiving a rule or other measuring means to extend over the surface of the workpiece and a second and third opening for slidingly receiving first and second indicators respectively therein for extending over the surface of the rule to indicate settings upon the rule. The guide further includes first clamping means for clamping against the workpiece and second clamping means for clamping against the surface of the rule at a predetermindd setting.

The present invention also comprises a system of measuring a desired cut of the workpiece by employing at least one of the above described guides and a straight edge. The straight edge is used as a guide for a saw blade wherein the width of the cut is measured by the guide and associated rule or other similar measuring device and a straight edge which is secured to the workpiece at a predetermined distance as measured by the guide or guides.

It is accordingly a principle object of the present invention to provide a guide to accurately measure the width of cut to be made along a workpiece, such as plywood and the like.

It is a further object of the present invention to provide a measuring system for the cutting of a workpiece which is highly accurate and fast in the setting of a straight edge for guiding of a saw.

It is a still further object of the present invention to provide for such a guide and measuring system which is both convenient and expeditious to use.

Further objects and advantages of the present invention will become more readily apparent from the following detailed description.

DESCRIPTION OF THE INVENTION

FIG. 1. is a perspective view of the guide of the present invention.

FIG. 2 is a cross sectional view showing a workpiece in operative position in relation to the guide of the present invention for cutting of a predetermined width from the workpiece.

FIG. 3. is a top view of both the guide and the guide system of the present invention.

DETAILED DESCRIPTION OF THE INVENTION

Referring initially to FIG. 1. the guide of the present invention is denoted generally by the arrow 10. The guide 10 includes a bottom or base portion 12 which receives a clamp 14. The base portion 12 includes a support portion 18 and a threaded portion 20 which threadingly receives the aforementioned clamp 14, as shown. The support portion 18 carries thereon a plate 21 which is secured to the support portion 18 by any suitable means such as by welding, casting or molding and may be integral therewith. As shown, the plate 21 includes a flange having a planar surface 22 which serves to abut against a workpiece to be cut, and which is hereafter describe in more detail. A planar plate 24 is secured to the plate 21 by means of screws 26 and includes slots for slidingly receiving a rule 30 and indicators 32 and 34, as shown in FIG. 1.

A tightening clamp 36 is threadingly received through a threaded hole in a support portion 40 for receiving the clamp 36 with the support portion 40 preferably being integral or welded to or casted or molded with the top surface of the plate 24. Threaded holes are provided in the support portion 40 for threadingly receiving screws 42 and 44 which are operative to tighten against the slideable indicators 32 and 34 respectively and thereby secure them into place at a predetermined setting on the rule 30. Likewise the rule 30 may be set at a predetermined setting by tightening and loosening of the clamp 36 against the surface of the rule 30, as in the case of the screws 42 and 44 against their respective indicators.

In operation at least one guide 10 is secured against the underside of a workpiece 48 by means of clamp 14 as shown in FIG. 2. The predetermined distance of the width of the cut 48 desired is obtained, when cutting from the directions of arrows 54 and 56, by first setting of the indicator 32 at a distance from the surface of the flange 22, which abuts against the workpiece as shown in FIG. 2, which corresponds to the width of guide plate portion 58 of for, example, a hand power saw 60 plus the distance of the saw blade 62 from the guide portion 58, that is, the total distance from the flange 22 to the saw blade 62 . The thickness of the saw blade 62 is also added when close tolerances are required. The indicator 32 when set is secured by means of the screw 42 securedly engaging the surface of the indicator 32 and serves to indicate on the rule the width of the cut to be made. As aforementioned the rule 30 is secured into place by means of tightening of the clamp 36 against the surface thereof and when set the straight edge 70 is abuted against the end of the rule 30, as shown in FIG. 3 and the straight edge 70 then operatively secured into place by means of clamps 72 and 74. The guide or guides 10 are then removed for cutting of the workpiece 48. Thus, in this fashion, the distance to the saw blade 62 and its thickness is factored in by the setting of the indicator 32 and the rule is then set at the exact width to be cut by guiding of the guide plate portion 56 along the straight edge 70, as indicated in FIG. 3. Thus if a six inch width cut is desired the rule 30 is merely set at six inches as indicated by the edge of the indicator 32 on the rule 30.

When making a cut from the opposite side of the straight edge 70, as indicated by the arrows 76 and 78, then the indicator 34 may be employed. When using the indicator 34 the aforementioned distance to the saw blade and the width of the straight edge 70 are added together and the indicator 34 is set at this distance, without adding in the thickness of the saw blade 62, from the abutting edge of the flange 22, or the edge of the workpiece 48, by measuring with the rule 30. The indicator 34 is similarly secured into place by means of the screw 44. The rule 30 is then set at the desired mark on the rule 30, as indicated by the edge of the indicator 34 to correspond to the width of the desired cut 48.

The present invention thus provides for a convenient and expeditious method of accurately cutting or sawing a board and the like to a predetermined width, and, in addition, once the guides are set as described additional cuts of the same width are easily and conveniently made.

Naturally other means of measuring employing other reference points on the guide of the present invention may be employed and the aforementioned methods are provided as illustrative examples and one may have a preference insofar as convenience is concerned, such as dictated by the work area, as to which particular method to employ.

While specific embodiments of the present invention have been described it is understood that all matter herein is to be interpreted merely as illustrative and not in a limiting sense.

What is claimed is:

1. A guide having a first planar surface for placement upon the surface of a workpiece and a second planar surface perpendicular to said first planar surface for placement against an edge of said workpiece, said guide having a firsl opening slidingly receiving a rule and second and third openings for slidingly receiving first and second indicators, first clamping means operative to clamp against the surface of said workpiece and second clamping means operative to clamp against the surface of said rule, and first and second indicators slidingly received within said second and third openings respectively, said rule being operative to extend over the surface of said workpiece and said first and said second indicators being operative to extend over the surface of said rule to indicate a predetermined setting for said rule relative to the surface of said workpiece.

2. A guide in accordance with claim 1 wherein said first and said second indicators are in opposition and extendable in opposing directions.

3. A guide in accordance with claim 2 further including means for securing said first and said second indicators at a predetermined setting on said rule.

4. A measuring system for sawing a predetermined width of a board and the like from a workpiece comprising at least one guide comprising a first planar surface for placement upon the surface of a workpiece and a second planar surface perpendicular to said first planar surface for placement against an edge of said workpiece, said guide having an opening for slidingly receiving a rule and second and third openings for slidingly receiving first and and second indicators, first clamping means operative to clamp against the surface of a workpiece and second clamping means operative to clamp against the surface of said rule, and first and second indicators slidingly received within said second and third openings respectively, said rule being operative to extend over the surface of said workpiece, said first and said second indicators being operative to extend over the surface of said rule to indicate a predetermined setting for said rule relative to the surface of said workpiece, and a straight edge in abutment with the end of said rule at a predetermined setting wherein said straight edge is secured to said workpiece and provides a guide for travel of a saw along its length for said sawing.

5. A measuring system in accordance with claim 4 wherein said system includes at least two of said guides and said straight edge is in planar abutment with the ends of each rule of each of said guide.

6. A measuring system in accordance with claim 5 further including means for securing said first and said second indicators at a predetermined setting on said rule.

* * * * *